US009883377B2

(12) United States Patent
Cheng

(10) Patent No.: US 9,883,377 B2
(45) Date of Patent: Jan. 30, 2018

(54) APPARATUS FOR FACILITATING AUTOMATIC BEVERAGE PREPARATION VIA CYBER ORDERING

(71) Applicant: Bi Cheng, Los Altos, CA (US)

(72) Inventor: Bi Cheng, Los Altos, CA (US)

(*) Notice: Subject to any disclaimer, the term of this patent is extended or adjusted under 35 U.S.C. 154(b) by 303 days.

(21) Appl. No.: 14/626,805

(22) Filed: Feb. 19, 2015

(65) Prior Publication Data

US 2015/0230653 A1 Aug. 20, 2015

Related U.S. Application Data

(60) Provisional application No. 61/941,956, filed on Feb. 19, 2014.

(51) Int. Cl.

| | | |
|---|---|---|
| *A47J 31/40* | (2006.01) | |
| *H04W 8/24* | (2009.01) | |
| *A47J 31/46* | (2006.01) | |
| *A47J 31/52* | (2006.01) | |
| *A23F 5/26* | (2006.01) | |
| *A23F 3/18* | (2006.01) | |

(52) U.S. Cl.
CPC ............ *H04W 8/24* (2013.01); *A47J 31/407* (2013.01); *A47J 31/46* (2013.01); *A47J 31/52* (2013.01); *A23F 3/18* (2013.01); *A23F 5/26* (2013.01); *A47J 31/467* (2013.01)

(58) Field of Classification Search
CPC .. H04W 8/24; A47J 31/46; A47J 31/52; A47J 31/467; A47J 31/407; A23F 3/18; A23F 5/26
See application file for complete search history.

(56) References Cited

U.S. PATENT DOCUMENTS

| | | | | |
|---|---|---|---|---|
| 2003/0236824 | A1* | 12/2003 | Alsafadi ............... | G06F 9/5055 709/203 |
| 2006/0124659 | A1* | 6/2006 | Mosconi ............. | A47J 31/3623 221/161 |
| 2009/0157515 | A1* | 6/2009 | Lafauci .................. | G06Q 10/06 705/15 |
| 2010/0198643 | A1* | 8/2010 | Friedman ........... | G06Q 30/0241 705/14.4 |

(Continued)

FOREIGN PATENT DOCUMENTS

JP 10-340380 * 12/1998

*Primary Examiner* — Anthony Weier
(74) *Attorney, Agent, or Firm* — James M. Wu; JW Law Group

(57) ABSTRACT

Method and automatic beverage-dispensing unit ("ABU") capable of automatically preparing beverage in accordance with an order via a communications network are included. In one aspect, ABU includes a communication device, a beverage preparing device, and a beverage dispenser wherein the communication device communicates with a user via a wireless communications network. The beverage preparing device, in one example, includes a pod mixer and a liquid receptacle, wherein the pod mixer is configured to select a first pod from multiple pods in accordance with the order from a user. The liquid receptacle prepares liquid substance such as water based on the pod selected. The beverage dispenser mixes the pod and the liquid substance to produce a beverage which is stored in a temperature controlled dispensing compartment for pickup.

17 Claims, 6 Drawing Sheets

(56) References Cited

U.S. PATENT DOCUMENTS

2012/0156337 A1* 6/2012 Studor .................... A47J 31/44
426/231
2013/0263745 A1* 10/2013 Bombeck ................ A47J 31/24
99/293
2013/0284029 A1* 10/2013 Reed .................... G06Q 10/067
99/280

* cited by examiner

APPARATUS FOR FACILITATING AUTOMATIC BEVERAGE PREPARATION VIA CYBER ORDERING

PRIORITY

This application claims the benefit of priority based upon U.S. Provisional Patent Application Ser. No. 61/941,956, filed on Feb. 19, 2014 in the name of the same inventor(s) and having a title of "Method and Apparatus for Facilitating Automatic Beverage Preparation via Cyber Ordering," hereby incorporated into the present application by reference.

FIELD

The exemplary embodiment(s) of the present invention relates to the field of vending machine. More specifically, the exemplary embodiment(s) of the present invention relates to beverage storage, preparation, and distribution.

BACKGROUND

Beverages, also known as drinks, are liquids specifically produced for consumption. Beverages are usually categorized as alcoholic beverages and non-alcoholic drinks. While alcoholic beverage includes wine, beer, and liquor, non-alcoholic beverage can be further categorized as hot drinks and cold drinks. The old drinks may include juice, soft drinks, ice-tea, ice-coffee, and water. The hot drinks include coffee, tea, coco, hot chocolate, and the like.

A problem associated with conventional beverage preparation, storage, and distribution is that it requires labor-intensive operations especially for hot drinks. A conventional approach to mitigate this labor-intensive service operation is to use a vending machine. A vending machine is an independent machine capable of providing selected merchandise when the selection is made and the selected merchandise is in stock. A vending machine dispenses selected item or items when a customer activates the machine using, for example, coins or tokens. A drawback associated with a conventional vending machine is that it has limited selections with primitive operations.

SUMMARY

Method and automatic beverage-dispensing unit ("ABU") capable of automatically preparing beverage in accordance with an order via a communications network are disclosed. In one aspect, ABU includes a communication device, a beverage preparing device, and a beverage dispenser wherein the communication device communicates with a user via a wireless communications network. The beverage preparing device, in one example, includes a pod mixer and a liquid receptacle, wherein the pod mixer is configured to select a first pod from multiple pods in accordance with the order from a user. The liquid receptacle prepares liquid substance such as hot water based on the pod selected. The beverage dispenser mixes the pod and liquid substance to prepare a beverage such as coffee which can subsequently be placed in a temperature controlled dispensing compartment for pickup.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
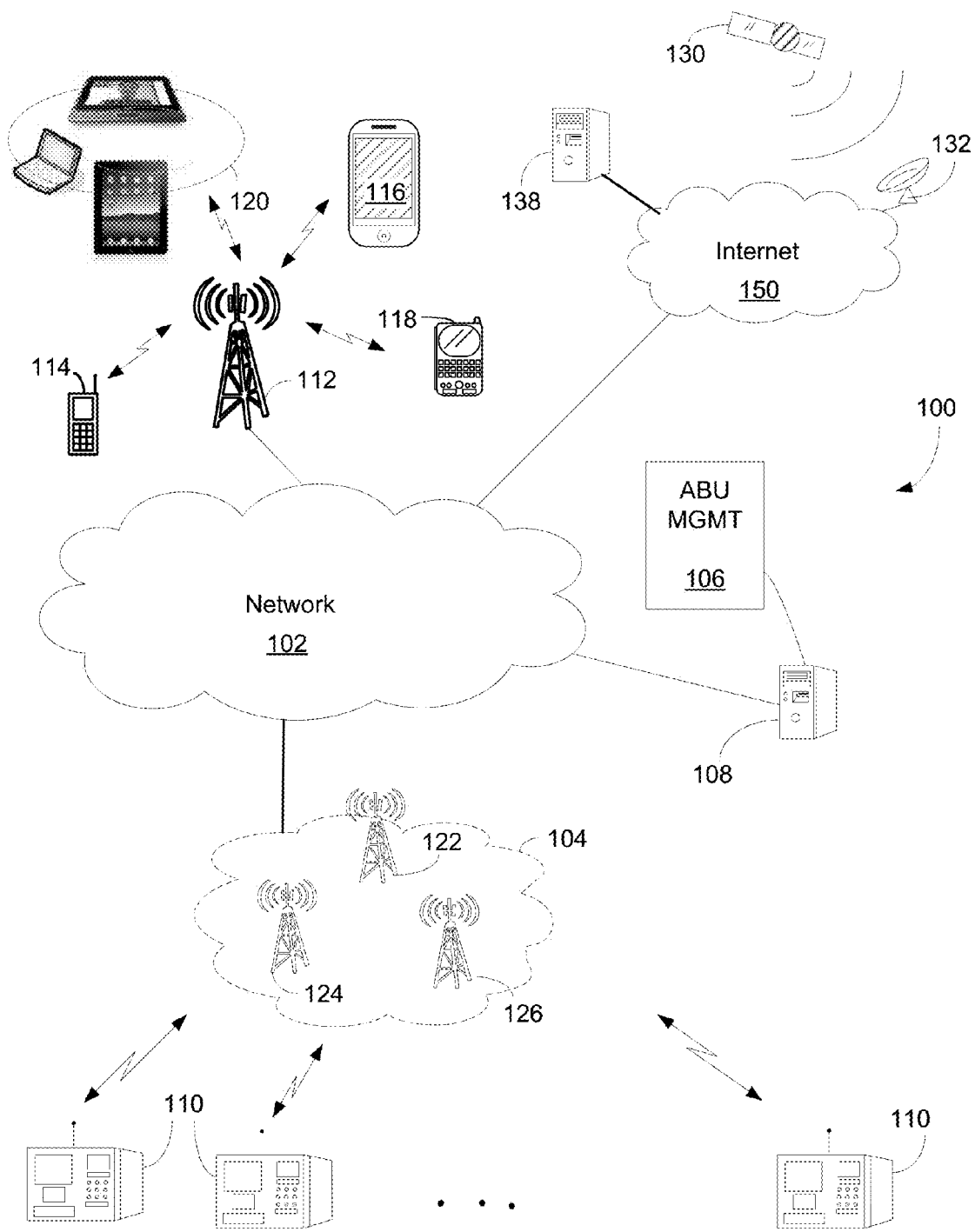
FIG. 1 is a block diagram illustrating a network configuration containing multiple ABUs capable of communicating with portable devices via a network in accordance with one embodiment of the present invention.

Exemplary embodiment(s) of the present invention is described herein in the context of a method, system and apparatus of preparing, managing, and distributing beverage using network based apparatus.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

References to "one embodiment," "an embodiment," "example embodiment," "various embodiments," "exemplary embodiment," "one aspect," "an aspect," "exemplary aspect," "various aspects," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

Communication network means any type of network that is able to transmit data in a form of packets, cells, or frames. A communication network may be, for example, an IP communication network or an IP network carrying traffic packed in cells such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may include one or more a satellite network, a DVB-RCS (Digital Video Broadcasting-Return Channel System) network, an SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, the evolution of the UMTS known as LTE (Long Term Evolution), or DVB-H (Digital Video Broadcasting-Handhelds)), a hybrid (satellite and terrestrial) network, and/or an optical network.

In accordance with the embodiment(s) of present invention, the components, process steps, and/or data structures described herein may be implemented using various types of operating systems, computing platforms, computer programs, and/or general purpose machines. In addition, those of ordinary skills in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processors and systems, control logic, ASICs, chips, workstations, mainframes, etc.

The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to the block and flow diagrams, are typically performed in a different serial or parallel ordering and/or by different components and/or over different connections in various embodiments in keeping within the scope and spirit of the invention.

As used herein, the singular forms of article "a", "an" and "the" are intended to include the plural forms as well, unless the context clearly indicates otherwise. Also, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

One embodiment of the present embodiment discloses an automatic beverage-dispensing unit ("ABU") which is capable of automatically preparing beverage based on an online order received via a communications network. In one aspect, ABU includes a communication device, a beverage preparing device, and a beverage dispenser wherein the communication device communicates with a user or consumer via a wireless communications network. The beverage preparing device, in one example, includes a pod (i.e., coffee or tea) mixer and a liquid receptacle (i.e., water boiler), wherein the pod mixer is configured to select a type of pod from multiple pods such as coffee beans in accordance with the order specified by a user. The liquid receptacle or boiler prepares liquid substance such as water based on the selected pod. The beverage dispenser mixes or brews the pod with water to make a cup of beverage. The cup is subsequently stored in a temperature controlled dispensing compartment for pickup.

FIG. 1 is a block diagram 100 illustrating a network configuration containing multiple ABUs capable of communicating with users' portable devices via a network in accordance with one embodiment of the present invention. Diagram 100 illustrates ABUs, communication network 102, switching network 104, and Internet 150. In one aspect, network 102 can be wide area network ("WAN"), metropolitan area network ("MAN"), local area network ("LAN"), satellite/terrestrial network, or a combination of WAN, MAN, and LAN. It should be noted that the underlying concept of the exemplary embodiment(s) of the present invention would not change if one or more blocks (or networks) were added to or removed from diagram 100.

Network 102 generally includes multiple network nodes, not shown in FIG. 1, wherein each node may include mobility management entity ("MME"), radio network controller ("RNC"), serving gateway ("S-GW"), packet data network gateway ("P-GW"), or HomeAgent in order for network to function. In one aspect, network 102 is coupled to Internet 150, ABU server 108, base station 112, and switching network 104. ABU server 108, in one embodiment, includes ABU management module 106 which can be software, hardware, or combination of software and hardware component.

Switching network 104, which can be referred to as packet core network, includes cell sites 122-126 capable of providing radio access communication, such as 3G ($3^{rd}$ generation), 4G, or 5G cellular networks. Switching network 104, in one example, includes IP and/or Multi Protocol Label Switching ("MPLS") based network capable of operating at a layer of Open Systems Interconnection Basic Reference Model ("OSI model") for information transfer between clients and network servers. In one embodiment, switching network 104 is logically coupled to a set of ABUs across a geographic area via cellular networks. It should be noted that the geographic area may refer to a campus, city, metropolitan area, country, continent, or the like.

Base station 112, also known as cell site, node B, or eNodeB, includes a radio tower capable of coupling to various user equipments ("UEs"), such as a cellular phone 114, handheld device 118, iPhone® 116, tablets and/or iPad® 120 via wireless communications. Handheld device 118 can be a smart phone, such as iPhone®, BlackBerry®, Android®, and so on. Base station 112, in one example, facilitates network communication between mobile devices such as portable handheld device 114-120 with ABUs 110 via wired and wireless communications networks. It should be noted that base station 112 may include additional radio towers as well as other land switching circuitry.

Internet 150 is a computing network using Transmission Control Protocol/Internet Protocol ("TCP/IP") to provide linkage between geographically separated devices for communication. Internet 150, in one example, couples to supplier server 138 and satellite network 130 via satellite receiver 132. Satellite network 130, in one example, can provide many functions as wireless communication as well as global positioning system ("GPS"). For example, ABU 110 can receive GPS information from satellite network 130 via Internet 150, network 102, and switching network 104.

ABU 110 can also be referred to as stationary beverage distribution machine and/or pod-press coffee vending ("PCV") machine. A function of ABU 110 is able to remotely connect to user's smart phone, notebooks, iPad®, and/or PC via wireless connection whereby a user or users can pre-order his or her drinks such as coffee before arriving at ABU 110. Connecting to user's smart phone calendar allows the user to place coffee order a day, a week, or a month earlier. ABU 110 is also able to connect to ABU server 108 which may be a cloud-based system capable of managing every ABU 110 within its district.

To simplify ordering process, a mobile application software ("app") relating to beverage ordering can be downed from ABU website supported by ABU management 106 to a mobile device such as iPhone® 116 or portable device 118. A mobile app is a computer program with icon(s) configured to run on smartphones, tablets, and/or portable devices. For example, through a free-download mobile app, a custom order can be selected and sent to an ABU or pod-press vending machine via a wireless communications network.

During an operation, a user or customer clicks or taps an icon of mobile app on iPhone® 116 and a specific or tailored order of coffee is sent from iPhone® 116 to ABU server 108 via base station 112 and network 102. Upon receipt of the order, ABU 108 verifies the order based on a predefined set of verification files such as user profile stored in ABU management 106 and subsequently forwards the order or modified order via network 102-104 to one of ABU 110 which is located closest to iPhone® 116. ABU 110 begins to prepare the coffee based on the selected coffee. For example, the order may specify the type of coffee beans and the size of drink. Based on either a specific time specified in the order or estimated pickup time, ABU 110 prepares the coffee and stored the coffee in a temperature controlled compartment waiting for pickup or consumption. The estimated time, in one embodiment, can be calculated based on the distance between the physical location of iPhone® 116 and the location of ABU 110. Note that the physical location of iPhone® 116 can be identified via GPS tracking information.

One advantage of using ABU to distribute beverage such as coffee is to automatic beverage preparation and distribution of drinks. Note that mobile order and online payment allow consumers to purchase beverage such as coffee with simple taps on their mobile device and the beverage such as coffee will be ready with almost 100% automation. ABU can also be integrated into iCloud® or other service cloud for automatic payments as well as online ordering. Note that the prepared beverage is sealed and kept in temperature controlled tank for pickup. Another benefit of deploying ABU is that it allows a consumer to enjoy a hot coffee without waiting in-line or standing in cold.

Figure 2:
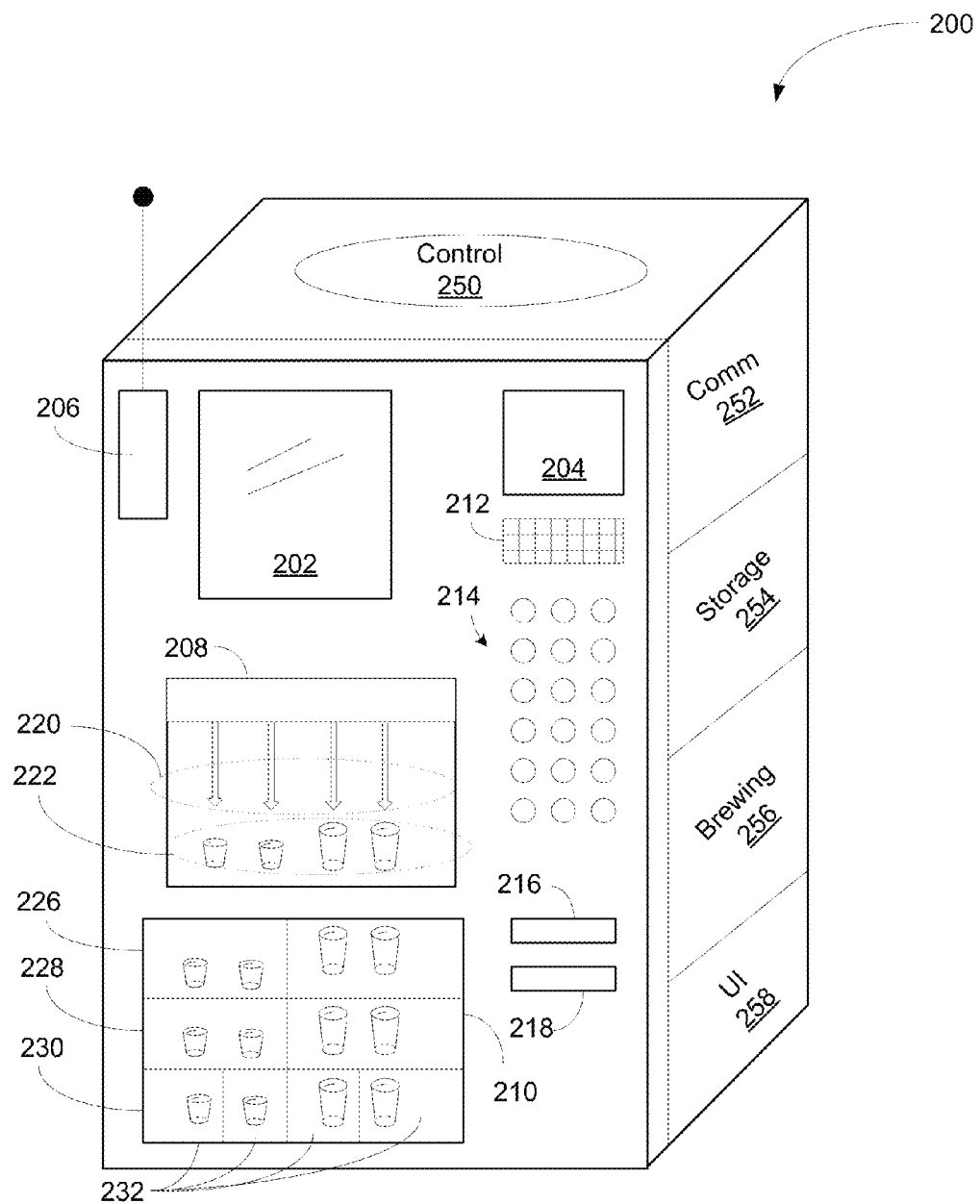
FIG. 2 is a block diagram illustrating an ABU capable of preparing online ordered beverage in accordance with one embodiment of the present invention.

FIG. 2 is a block diagram illustrating ABU 200 capable of preparing online ordered beverage in accordance with one embodiment of the present invention. ABU 200 includes a display 202, touch panel 204, wireless transceiver 206, brewer 208, dispenser 210, and various modules. In one embodiment, modules include control module 250, communication device 252, storage device 254, brewing device 256, and user interface ("UI") 258. UI 258, in one aspect, is configured to control speaker 212, selection buttons 214, card slot 216, and receipt slot 218. The modules include hardware, software, firmware, and a combination of hardware, software, and firmware. It should be noted that the underlying concept of the exemplary embodiment(s) of the present invention would not change if one or more blocks (or networks) were added to or removed from FIG. 2.

ABU 200, in one embodiment, includes communication device 252, brewer 208, and dispenser 210. Communication device 252 coupled to wireless transceiver 206 is able to communicate with a user via a wireless communications network. Wireless transceiver 206 is capable of receiving and/or transmitting information using WiFi, cellular network, and/or satellite communications network. WiFi is defined as wireless local area network ("WLAN") based on the Institute of Electrical and Electronics Engineers' (IEEE) 802.11 standards. In one aspect, communication device 252 is configured to receive one or more beverage orders simultaneously from multiple users via user's wireless-capable portal devices via a network or cloud computing network.

Brewer 208, which is also known as beverage preparing device, includes a pod mixer and a liquid receptacle, not shown in FIG. 2. The pod mixer is configured to select a type of pod from a list of pods in accordance with customer's online order. For instance, based on customer's selection, a specific type of coffee bean is selected from a list of coffee beans. Brewer 208, in one embodiment, includes a timer which is capable of activating beverage preparation process based on estimated pickup time. To estimate a pickup time, a distance for a customer to travel to ABU can be calculated. For example, a distance between user's smart phone and ABU 200 can be calculated using information from global positioning system ("GPS"). In one aspect, upon identifying ordered coffee bean, the pod mixer is able to obtain the specified coffee beans and grinds the beans if needed. The liquid receptacle acquires a predefined amount of liquid substance such as water based on the ordered coffee and the water is subsequently heated to a predefined temperature range in accordance with the selected coffee. The liquid receptacle, in one example, can be a water boiler capable of heating water based on the selected pod. For example, if the optimal water temperature to brew a certain type of coffee bean is 90 Celsius ("° C."), the boiler is able to heat the water to 90° C. before it starts to brew the coffee.

Brewer 208, in one aspect, includes brewing nozzles 220 and cup retriever 222, wherein brewing nozzles 220 may further includes a set of stir-sticks. A stir-stick may be used to stir the beverage as it is pouring into a cup. For example, the stir-stick can be effective if cream is mixed into the coffee. Brewer 208, in one example, may be able to handle two or three different sizes of cups.

Dispenser or beverage dispenser 210 is able to place the cup of prepared beverage in a temperature controlled dispensing compartment 226-228 waiting for pickup. Beverage dispenser 210 also includes a beverage pickup slot 230 which is able to authenticate the user before the beverage is being picked up. Note that the prepared beverage is kept to a predefined temperature range. It should be noted that ABU 200 is capable of preparing multiple cups of beverage at the same time or approximately the same time.

Dispenser 210, also known as coffee cup dispenser, supports one or multiple cup sizes and manages pickup slot 230. After ordering remotely for a cup of coffee, the coffee is prepared. The cup filled with prepared coffee is covered and/or sealed and is placed in a storage tank or storage bin 232. In one example, the storage tank or bin 232 is temperature-constant environment which keeps the coffee in an optimal temperature range for consumption while waiting for pickup. It should be noted that ABU 200 can also be located in a driving-through pickup location.

ABU 200, in one embodiment, further includes a pod storage or storage device 254 which is used to store pods. For example, pod storage 254 stores multiple types of coffee beans, tea leafs, herbs, and multiple types of beverage mixers. To maintain quality of beverage, multiple environmental controlled individual storage compartments within pod storage 254 are used for separate storage for each type of pods or coffee beans. To maintain beverage quality control, the pod storage employs a pod extractor which is able to discard one or more group of pods from the pod storage based on a predefined set of freshness or perishable conditions.

Transceiver 206, in one example, is a WiFi Transceiver with an antenna, and has a built-in component which is compliant with WiFi under IEEE 802.11a/b/g/n. A function of transceiver 206 is to accept a remote order and online payment. Transceiver 206 is also able to deliver real-time sales data, machine alerts, inventory tracking and/or other status information to an operator or remote server.

In one aspect, graphic display or display 202 is a screen capable of imaging information. For example, display 202 displays nutritional information, beverage preparation process, beverage selections, weather information, traffic condition, local news, announcement, and the like. In one aspect, display 202 has an interactive capability capable of communicating with the user. Also, different types of advertisements such as shoes and food promotions can be displayed and/or projected.

Touch panel 204 is a touch-sensitive flat panel display capable of providing interactive communication between ABU 200 and a user. For example, a user or customer can select beverage based on availability of ABU 200 at the time since certain listed coffee beans may have been sold out. In another example, a user may be able to communicate with a remote administrator via speaker 212. Speaker 212, in one example, includes a microphone which is able to receive user's voice instruction. Also, speaker 212 may provide Hi-Fi sound effect and/or music when it senses a user(s) close-by or present.

Selection buttons or buttons 214 are pod choice buttons which allow a user to select his or her favorite pod (i.e., coffee or tea). Buttons 214 also provide onsite selection of ingredients, taste, pricing, temperature, etc. It should be noted that buttons 214 can also be replaced with touch sensitive display which imitates buttons.

Card slot 216 is a mechanical device capable of accepting a payment from a credit, debit, or gift card when the card is inserted into the slot. Alternatively, the card slot 216 can be a card reader capable of sensing or reading information from the card when it is near the slot. For example, a user can place a card or iPhone® near the slot and the slot can obtain necessary information from the card or iPhone® for access as well as payment. In one embodiment, card slot 216 is configured to verify customer's identity in accordance with the order whereby the customer is allowed to pick up the prepared beverage such as coffee in pickup slot 232. Receipt slot 218, upon request, is able to print a receipt or optional receipt for the transaction. In one embodiment, receipt slot 218 is also able to send a soft receipt via an email to customer's smart phone.

Figure 3:
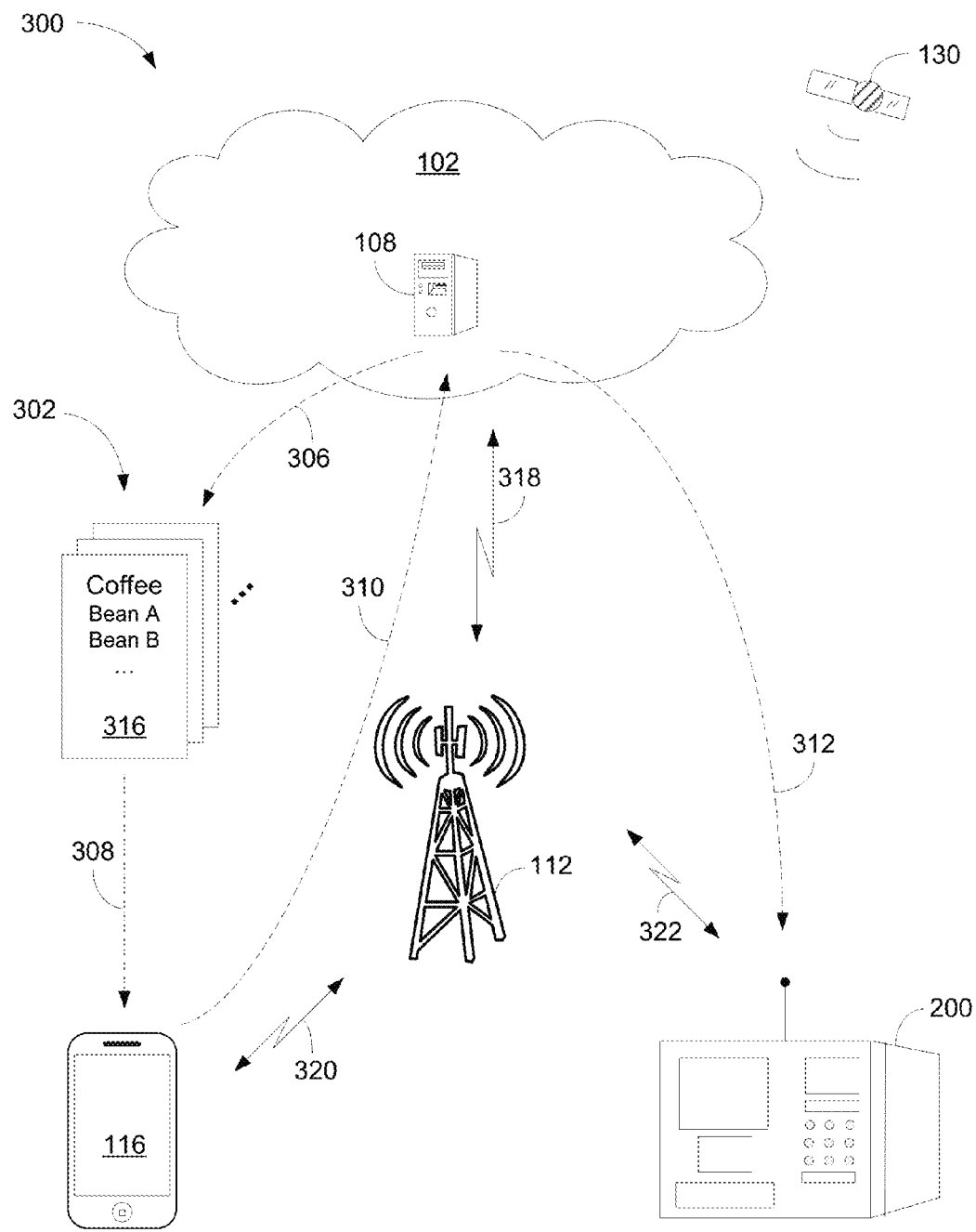
FIG. 3 is a logic block diagram illustrating a communications network including ABU for automatic beverage delivery in accordance with one embodiment of the present invention.

FIG. 3 is a logic block diagram 300 illustrating a communications network including ABU for automatic beverage delivery in accordance with one embodiment of the present invention. Diagram 300 includes a network 102, base station 112, iPhone®116, and ABU 200. Network 102 also includes ABU server 108 which monitors and manages automatic beverage delivery. iPhone®116, ABU 200, and ABU server 108 are connected via wired and/or wireless connections 318-322. Network 102, in one embodiment, is also coupled to a satellite 130 which is configured to provide terrestrial communication network. It should be noted that the underlying concept of the exemplary embodiment(s) of the present invention would not change if one or more blocks (or devices) were added to or removed from FIG. 3.

ABU 200 includes a transceiver, a beverage preparing device and a beverage dispenser. The transceiver, in one example, is able to receiving an order of green tea from a customer via a wireless communications network such as network 102. For example, the customer sends the order of green tea from his or her iPhone®116 to ABU 200 server 108 via base station 112 as indicated by dotted line 310. Upon verifying authenticity of the order, the green tea order is sent to ABU 200 from ABU server 108 to ABU 200 via base station 112 as indicated by dotted line 312. An advantage of using a wireless transceiver such as using WiFi or cellular network is capability to handle business remotely.

The beverage preparing device, which is also known as brewer, contains a pod mixer and a liquid receptacle. The pod mixer is able to select a type of green tea from a list of teas in accordance with the order. The liquid receptacle prepares water with a predefined temperature based on selected green tea. For example, if the optimal water temperature to brew the selected green tea is 90 C, the liquid receptacle prepares or heats water until it reaches 90 C.

The beverage dispenser, which is also known as dispenser, brews the green tea with the prepared water to generate a cup of green tea. The cup of green tea will wait in a temperature controlled dispensing compartment until a pickup is arranged. The dispenser further includes a beverage pickup slot which is able to authenticate the customer via customer's portable device.

ABU server 108, in one embodiment, is coupled to a satellite 130 and base station 112 via terrestrial and wireless network. In one example, satellite 130 is able to track physical location of smart phones using GPS tracking mechanism. The location of a smart phone which just ordered a beverage can be used to calculate the distance between the smart phone and ABU 200. The distance between the smart phone and ABU 200 can be used to estimate the pickup time of the beverage thereby the start of preparing the ordered beverage such as coffee can be determined based on the estimated pickup time.

ABU server 108 also maintains and updates beverage menu and/or selections. For example, various menus 302 are updated and stored in a local database of ABU server 108. Menu 316, for instance, is a coffee menu that contains a list of selectable beans such as bean A and bean B. In addition, ABU server 108 also provides restocking of beverage materials or supplies.

During an operation, upon tapping a mobile app, a set of beverage menus 302 is sent from ABU server 108 to iPhone®116 as indicated by dotted arrows 306-308. After selecting a listed beverage such as a coffee with bean A, an online order is composed and is sent from iPhone®116 to ABU server 108 as indicated by dotted arrow 310. Upon verifying the order, ABU server 108 forwards the order to ABU 200 via dotted arrow 312. The order can be modified by ABU server 108 based on the user profile. Depending on the applications, iPhone®116 can be configured to forward the online order directly to a nearby ABU 200 via base station 112. The beverage preparation begins based on estimated pickup time. The estimated pickup time can be obtained from user profile, order specification, and/or distance calculation.

An advantage of employing ABU is that it provides high quality beverage with minimal wait and process time.

Figure 4:
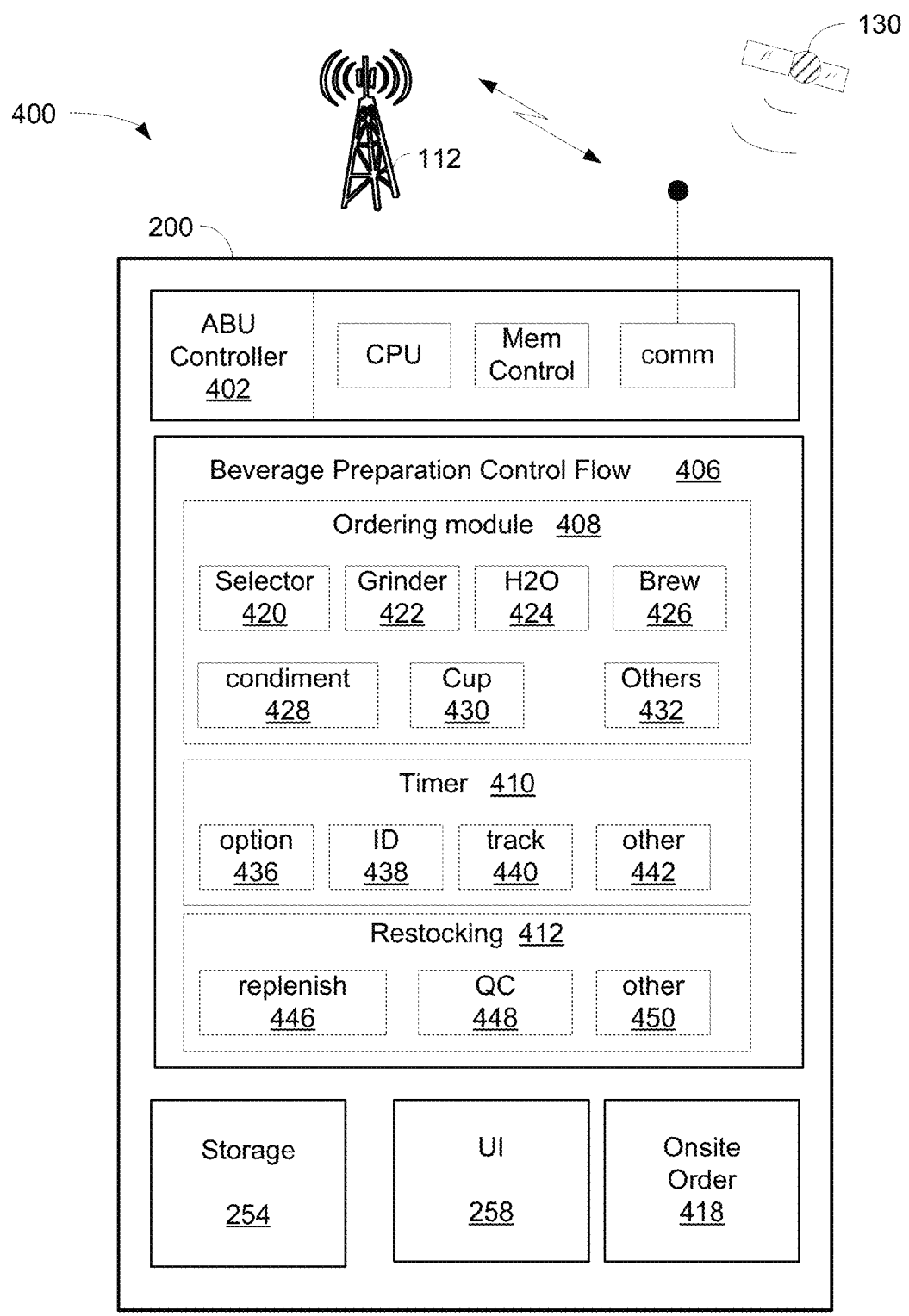
FIG. 4 is a block diagrams illustrating exemplary functional components or modules in ABU in accordance with one embodiment of the present invention.

FIG. 4 is a block diagrams 400 illustrating exemplary functional components or modules in ABU 200 in accordance with one embodiment of the present invention. ABU 200, in one embodiment, includes ABU controller 402, beverage preparation control flow ("BPC") 406, storage 254, UI 258, and onsite order 418. Controller 402 further includes central processing unit ("CPU"), memory controller, and communication transceiver. A function of controller 402 is to communicate with base station 112 and onsite order 418. Alternatively, controller 402 can be configured to access GPS network using satellite 130 to determine the distance between smart phones and ABU 200. It should be noted that the underlying concept of the exemplary embodiment(s) of the present invention would not change if one or more blocks (or devices) were added to or removed from FIG. 4.

BPC 406, in one embodiment, includes an ordering module 408, timer 410, and restocking module 412. Ordering module 408 includes a selector 420, grinder 422, water control ("H2O") 424, brewing management 426, condiment adder 428, cup assortment 430, and others 432. It should be noted that BPC 406 includes hardware, software, firmware, and a combination of hardware, software, and firmware.

Upon receiving an online order from a smart phone, selector 420 is able to process and select beverage material according to the content of order and/or user profile if user is registered with ABU 200. It should be noted that user profile file stores information relating to each individual product for taste, composition, temperature, user preferences, etc. Based on selected beverage material such as coffee beans, grinder 422 grinds or crushes coffee beans, for example, to prepare for brewing process. H2O 424 which can be a water boiler boils or heats water to an optimal temperature range based on the selected coffee beans. It should be noted that H2O 424 controls water temperature in the boiler constantly. Once the liquid substance such as hot water and coffee beans are prepared, brewing management 426 manages or controls brewing process using hot water and pressure. It should be noted that brewing management 426 includes brewing vessel with a pressured valve that ensures the entire coffee brewing cycle performed with predefined water pressure and/or steam pressure.

Once the ordered beverage such as coffee is brewed, condiment adder 428 prepares various condiments such as steam-proof sugar, milk, cream, et cetera based on the order, user preferences, and/or selected coffee beans. After adding the selected condiment to the coffee in a cup, a length adjustable stir-stick is used to mix the condiment with the coffee. Cup assortment 430 covers the cup containing the ordered coffee and store the cup in a temperature controlled pickup slot waiting to be picked up. In one aspect, ordering module 408 includes self-cleaning mixing circuitry, product delivery mechanism, modular cabinet built with corrosion resistance, and rust proof treatment.

Timer 410 includes option module 436, ID module 438, tracking module 440, and other 442. A function of timer 410 is to instruct BPC 408 when to begin the preparation process. While option module 436 determines time stamp stated in the order, ID module 438 identifies time stamp in the user profile. For example, a user can schedule a 9 AM pickup time every day. In one embodiment, timer 410 is able to automatically search user's scheduler to determine the pickup time. Alternatively, tracking module 440 can calculate an estimated pickup time based on the distance between the smart phone and ABU 200 via GPS information. Other 442 includes various other types of estimates of pickup time. For example, other 442 may obtain current traffic condition to factor in the calculation of the estimated pickup time. A function of using timer 410 is to guarantee best quality of beverage that ABU 200 can provide.

Restocking module 412 includes a replenishing component 446 and quality control component ("QC") 448. Replenishing component 446 tracks inventory of ABU 200 and orders additional supply when the inventory is lower than a predefined inventory replenishing level. Quality control component 448 is configured to police the stocking or inventory for beverage quality control. For example, if a perishable item such as milk or coffee beans passes its expiration date, QC 448 extracts the perishable item and discards it accordingly.

Onsite order 418, in one embodiment, can be part of communication module capable of interactively receiving command or order from an onsite customer. It should be noted that the ordering process can be slightly different between online ordering and onsite ordering. For example, customer verification step may not be necessary if the onsite ordering is taking place.

An advantage of employing ABU is that it provides an automation of beverage preparation and beverage delivery without involvement of service personal.

Figure 5:
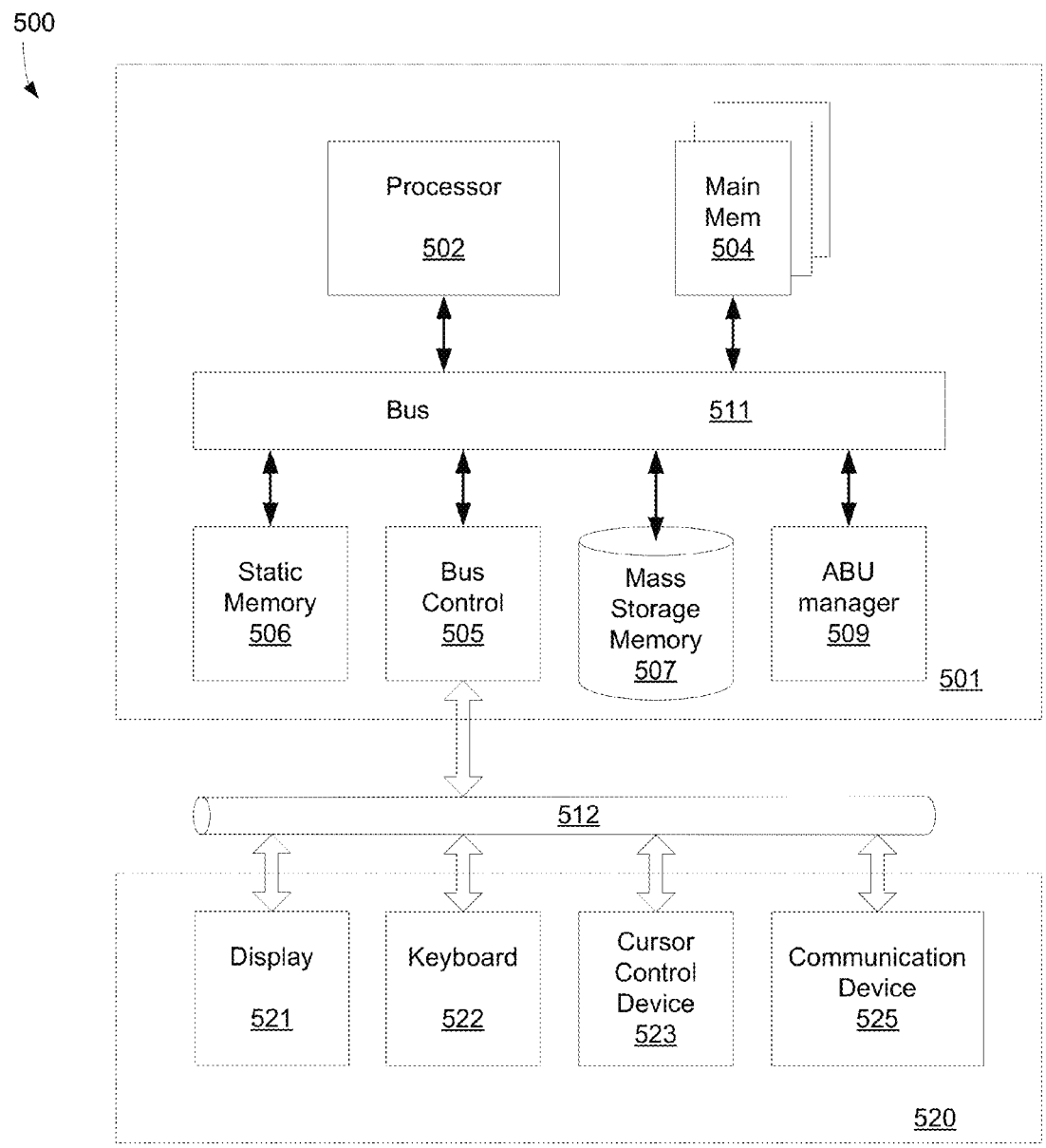
FIG. 5 is block diagram illustrating a digital processing system capable of managing and operating the ABU in accordance with one embodiment of the present invention.

Having briefly described one embodiment of the computer network in which the embodiment(s) of the present invention operates, FIG. 5 illustrates an example of a computer 500 which can be used within ABU for managing beverage preparation and delivery.

FIG. 5 is a block diagram illustrating a digital processing system capable of managing and operating the ABU in accordance with one embodiment of the present invention. Computer system or signal separation system 500 includes a processing unit 501, an interface bus 511, and an input/output ("IO") unit 520. Processing unit 501 includes a processor 502, a main memory 504, a system bus 511, a static memory device 506, a bus control unit 505, a mass storage memory 507, and ABU manager 509. It should be noted that the underlying concept of the exemplary embodiment(s) of the present invention would not change if one or more blocks (circuit or elements) were added to or removed from diagram 500.

Bus 511 is used to transmit information between various components and processor 502 for data processing. Processor 502 may be any of a wide variety of general-purpose processors, embedded processors, or microprocessors such as ARM® embedded processors, Intel® Core™2 Duo, Core™2 Quad, Xeon®, Pentium microprocessor, Motorola™ 68040, AMD® family processors, or Power PC™ microprocessor.

Main memory 504, which may include multiple levels of cache memories, stores frequently used data and instructions. Main memory 504 may be RAM (random access memory), MRAM (magnetic RAM), or flash memory. Static memory 506 may be a ROM (read-only memory), which is coupled to bus 511, for storing static information and/or instructions. Bus control unit 505 is coupled to buses 511-512 and controls which component, such as main memory 504 or processor 502, can use the bus. Bus control unit 505 manages the communications between bus 511 and bus 512. Mass storage memory 507, which may be a magnetic disk, an optical disk, hard disk drive, floppy disk, CD-ROM, solid-state drive (SSD) and/or flash memories are used for storing large amounts of data.

I/O unit 520, in one embodiment, includes a display 521, keyboard 522, cursor control device 523, and communication device 525. Display device 521 may be a liquid crystal device, cathode ray tube ("CRT"), touch-screen display, or other suitable display device. Display 521 projects or displays images of a graphical planning board. Keyboard 522 may be a conventional alphanumeric input device for communicating information between computer system 500 and computer operator(s). Another type of user input device is cursor control device 523, such as a conventional mouse, touch mouse, trackball, or other type of cursor for communicating information between system 500 and user(s).

Communication device 525 is coupled to bus 511 for accessing information from remote computers or servers, such as servers or other computers. Communication device 525 may include a modem or a network interface device, or other similar devices that facilitate communication between computer 500 and the network. Computer system 500 may be coupled to a number of servers 104 via a network infrastructure.

The exemplary aspect of the present invention includes various processing steps, which will be described below. The steps of the aspect may be embodied in ABU, venting machine, router, or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 6:
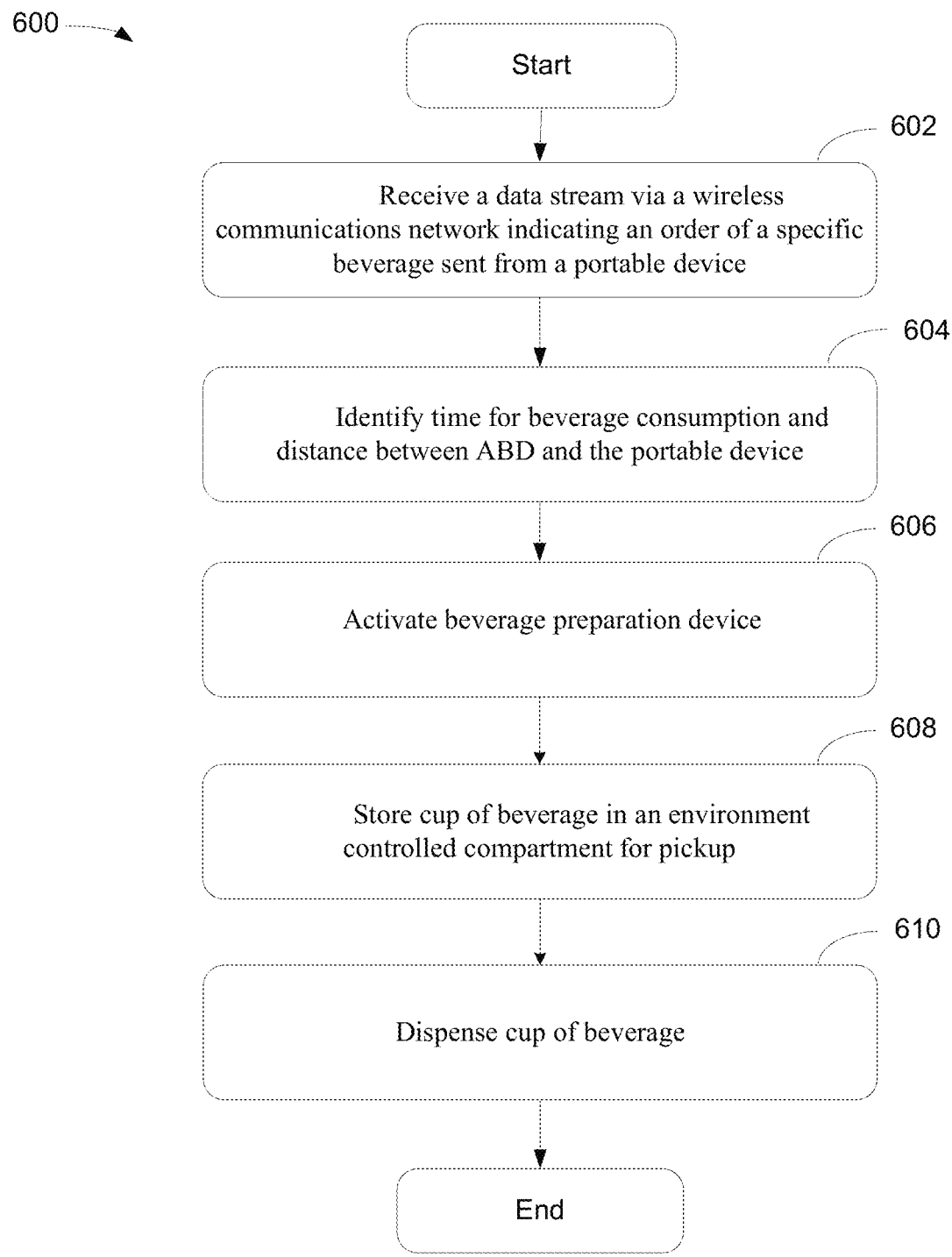
FIG. 6 is a flowchart illustrating an exemplary process of AUB in accordance with one embodiment of the present invention.

FIG. 6 is a flowchart 600 illustrating an exemplary process of AUB in accordance with one embodiment of the present invention. At block 602, a process for beverage service automation is capable of receiving a data stream via a wireless communications network indicating an order of a specific beverage sent from a portable device such as a smart phone. In one example, an order of coffee sent by a user via an iPhone phone is obtained or received.

At block 604, to identify an optimal range of time for beverage consumption, a distance between ABU and the portable device is determined or calculated based on information obtained from GPS. For example, upon locating current physical location of the smart phone using GPS information, minimal time required for the smart phone to reach ABU can be calculated based on GPS information as well as the current traffic condition.

At block 606, upon identifying a pickup time based on the distance between the smart phone and ABU, the beverage preparation device is activated to obtain necessary material for preparing a cup of beverage such as a 16 Oz cup of coffee in accordance with the order. For example, after fetching a predefined amount of coffee beans from a pod storage based on the order of coffee, the fetched coffee beans are grinded. To brew the grinded coffee beans, water is prepared to a predefined range of water temperature. After brewing, the brewed coffee is poured into a disposable cup.

At block 608, after preparation of beverage such as coffee, it is poured into a cup. The cup is subsequently stored in an environment controlled compartment to maintain freshness of the coffee. After authentication of the user or customer via the smart phone, the cup is dispensed from the environment controlled compartment to the customer.

At block 610, the process dispenses the cup of beverage to the customer when identity of the customer associated with the portable device is authenticated. In one aspect, a mobile app associated with ABU can be downloaded from a cloud computing network to the portable device wherein the app should simplify the beverage ordering process. For example, after selecting a specific beverage from a list of available beverages displayed in the portable device via an app, the data stream representing selected beverage to ABU can be sent with a single click.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A stationary beverage distribution machine, comprising:
    a communication device able to communicate with a user via a wireless communications network;
    a beverage preparing device, coupled to the communication device, having a pod mixer and a liquid receptacle, wherein the pod mixer is configured to select a first pod from a plurality of pods in accordance with a first order from a first user, and the liquid receptacle prepares first liquid substance based on the first pod;
    a beverage dispenser coupled to the beverage preparing device and configured to mix the first pod and the first liquid substance to produce a first beverage which waits in a first temperature controlled dispensing compartment for pickup; and
    a pod storage coupled to the beverage preparing device and configured to store the plurality of pods, wherein the pod storage, storing multiple types of coffee beans, tea leafs, herbs, and a plurality types of beverage mixers, includes a pod extractor configured to discard one or more pods from the plurality of pods based on a predefined set of freshness conditions.

2. The machine of claim 1, wherein the pod storage includes multiple environmental controlled individual compartments to store the plurality of pods.

3. The machine of claim 1, wherein the communication device is configured to receive a plurality beverage orders from multiple users' smart phones substantially simultaneous via a cloud computing network.

4. The machine of claim 1, wherein the beverage preparing device further includes a timer which is capable of activating beverage preparation process based on distance calculation between user's smart phone and the stationary beverage distribution machine via global positioning system ("GPS").

5. The machine of claim 1, wherein the pod mixer is able to identify user ordered coffee from a plurality types of coffee beans and grind the user ordered coffee if it is needed.

6. The machine of claim 5, wherein the liquid receptacle acquires a predefined amount of water based on the user ordered coffee and heats the water to a predefined temperature in accordance with the user ordered coffee.

7. The machine of claim 1, wherein the beverage dispenser includes a beverage pickup slot able to authenticate the user for pickup while keeping the first beverage at its predefined temperature.

8. The machine of claim 1,
wherein the pod mixer is able to select a second pod from the plurality of pods in accordance with a second order from a second user, and the liquid receptacle prepares second liquid substance based on the second pod; and
wherein the beverage dispenser is configured to mixing the second pod with the second liquid substance to produce a second beverage which waits in a second temperature controlled dispensing compartment for pickup.

9. A pod-press coffee vending ("PCV") machine, comprising:
a transceiver able to receiving an order of green tea from a customer via a wireless communications network;
a beverage preparing device, coupled to the transceiver, having a pod mixer and a liquid receptacle, wherein the pod mixer is able to select green tea from a plurality of teas in accordance with the order, and the liquid receptacle prepares water with a predefined temperature based on selected green tea;
a beverage dispenser coupled to the beverage preparing device and configured to brew the green tea with the water to produce a cup of green tea which waits in a temperature controlled dispensing compartment for pickup; and
a tea and coffee storage coupled to the beverage preparing device and configured to store the plurality of teas, wherein the tea and coffee storage, storing multiple types of coffee beans, tea leafs, herbs, and a plurality types of beverage mixers, includes a tea extractor configured to discard one or more teas from the plurality of teas based on a predefined set of freshness conditions.

10. The machine of claim 9, further comprising a beverage pickup slot coupled to the beverage dispenser and is able to authenticate the customer via customer's portable device.

11. The machine of claim 10, wherein the customer's portable device is a cellular phone.

12. The machine of claim 9, wherein the tea storage includes multiple environmental controlled individual compartments to store the plurality of teas.

13. The machine of claim 9, wherein the beverage preparing device further includes a timer which is capable of activating beverage preparation process based on distance calculation between user's smart phone and the stationary beverage distribution machine via global positioning system ("GPS").

14. The machine of claim 9, wherein the pod mixer is able to identify user ordered coffee from a plurality types of coffee beans and grind the user ordered coffee if it is needed.

15. The machine of claim 14, wherein the liquid receptacle acquires a predefined amount of water based on the user ordered coffee and heats the water to a predefined temperature in accordance with the user ordered coffee.

16. The machine of claim 9, wherein the pod mixer is able to select a second tea from the plurality of teas in accordance with a second order from a user, and the liquid receptacle prepares second liquid substance based on the second tea.

17. The machine of claim 16, wherein the beverage dispenser is configured to mixing the second tea with the second liquid substance to produce a second beverage which waits in a second temperature controlled dispensing compartment for pickup.

* * * * *